Aug. 30, 1932.  E. T. J. TAPP  1,874,384
SELF PROPELLED ROAD VEHICLE
Filed March 27, 1930
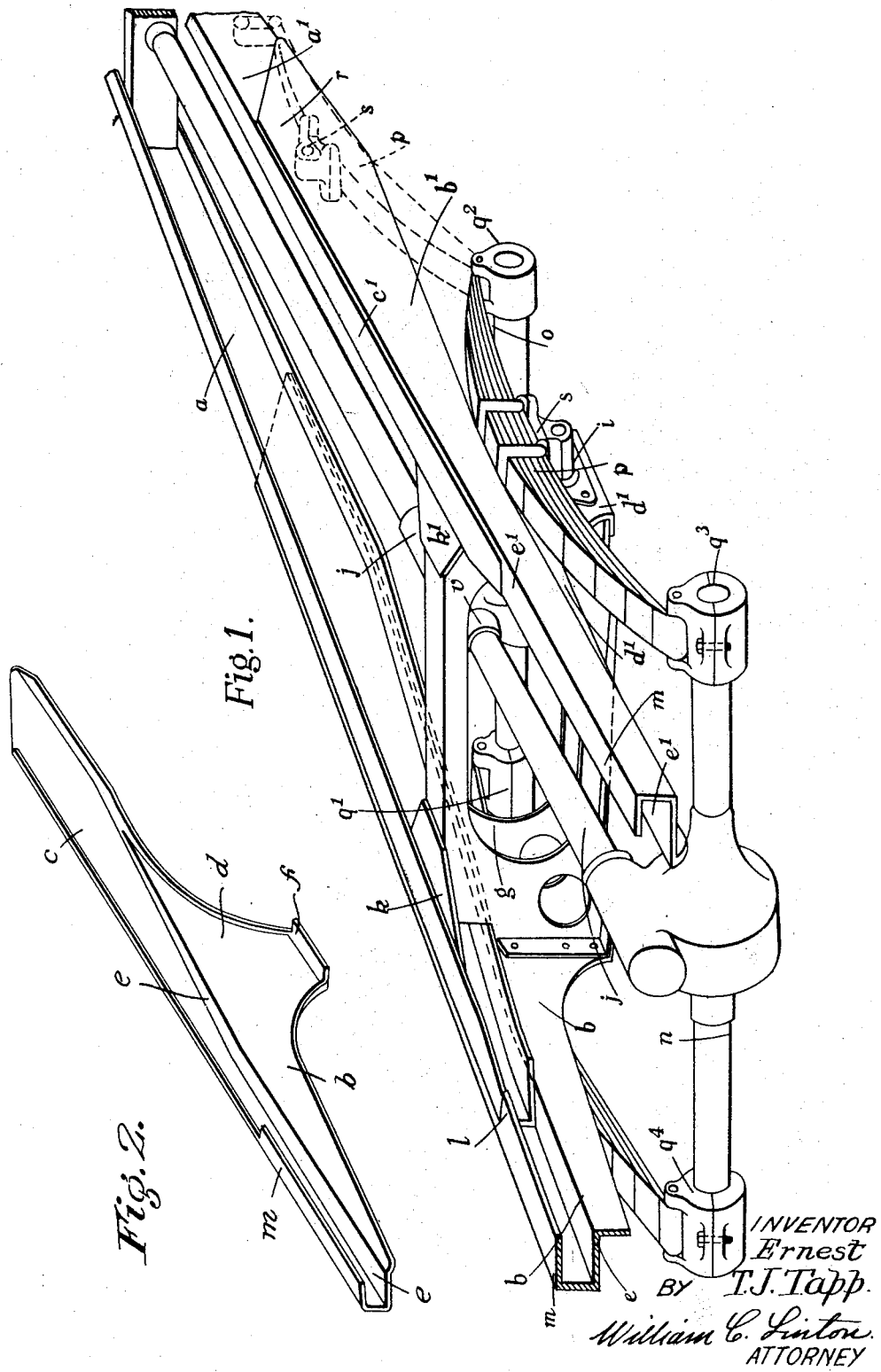

Patented Aug. 30, 1932

1,874,384

UNITED STATES PATENT OFFICE

ERNEST THOMAS JAMES TAPP, OF LONDON, ENGLAND

SELF-PROPELLED ROAD VEHICLE

Application filed March 27, 1930, Serial No. 439,498, and in Great Britain April 16, 1929.

This invention relates to self-propelled road vehicles particularly of the kind in which the chassis frame is of tapered construction, that is, wherein the side members are closer together at the front than at the rear.

In a vehicle of the kind set forth the rear axle is mounted on two cantilever springs arranged parallel to the side members of the chassis to which they are attached and therefore must be at a slight angle to each other. Each spring is fastened to its respective side member in two places, viz, at the end by a shackle and again near its centre by means of a trunnion at the top of the spring, the pinion which this trunnion rides being integral with a bracket riveted to the side member.

The objects of this invention are to provide means whereby an extra axle may be attached to a 4-wheeled vehicle of the kind set forth in such a manner as to permit the employment as far as possible, of standard parts, already incorporated in the construction of the vehicle with four wheels only, in order to convert it into a 6-wheeled vehicle and further to increase the carrying capacity of the said vehicle and render it more suitable for driving over uneven ground.

Accordingly an extension piece is fixed to each side member of the chassis, each piece comprising two flanges disposed one above the other and joined together by means of a ledge or step on which the side member may rest.

The lower flange is preferably deepened to accommodate the spring bracket.

The said two flanges may be disposed at such an angle to each other that the lower flanges of the additional side members are parallel to one another and to the chassis centre line when the upper ones are bolted to the tapered chassis side members.

The said extension pieces may be pressed out in one piece if desired.

The invention will now be described with reference to the accompanying drawing in which Figure 1 is a perspective view of one form of extension constructed in accordance with this invention and shown fitted to a vehicle chassis, and Figure 2 is a similar view of one extension piece.

Referring now to Figure 1, $a, a'$ are the two side members of the chassis; $b, b'$ are two extensions which are attached to the said side members.

The extensions comprise two flanges $c, d$, and $c', d'$, one above the other and joined together by means of a step or ledge $e, e'$ on which the side members $a, a'$ rest.

The same two flanges of each extension are so disposed at an angle to one another (equal to the angle subtended by each side member with the frame centre line) so that when the upper flanges $c, c'$ are attached flat against the side members $a, a'$, the lower flanges $d, d'$ are parallel to the centre line and to each other. It will be seen therefore that the ledges $e, e'$ must be tapered (see Figure 2). This figure shows the rear side extension, and a step $f$ on which the cross member $g$ rests is plainly seen.

The flanges $d, d'$ follow the contours of the frame members $a, a'$ along their top edges and are suitably deepened where the spring trunnion mountings are attached.

The extensions are braced across by a deep double cross member $g$ which is joined along the top so as to form an inverted U in section.

This member $g$ is formed with openings to accommodate the torque tube $j$ and brake gear. The said member is attached to the trunnion pin mounting by bolts or rivets passing through the flanges $d, d'$ and to the side members $a, a'$ by gusset plates $k, k'$.

The extensions $b, b'$ protrude beyond the extremities of the side members at $l, l'$ and from that point other flanges $m, m'$ continue the chassis frame level to the end of the extension. If greater strength is required, then the flanges may be just above the level of the frame members and extend over them for the complete length of the extension.

$n$ is the additional axle placed behind and attached to the original rear axle $o$ by means of the torque tube $j$ and ball joint $v$.

The offside spring $p$ is moved from its position shown in dotted lines to that shown in full lines and the near side spring is altered in a similar manner. The said springs join together the two axles $o$, $p$ by means of the shackles $q^1$, $q^2$, $q^3$, $q^4$. As the said springs are now further back, the chassis, owing to its tapered construction, is too wide to accommodate them in the same manner as before and further they are now parallel to one another and not at an angle. Therefore, the said springs are placed below the frame members $a$, $a'$ and attached to the flanges $d$, $d'$ by the trunnion pin mountings $r$ and block $s$ which have been moved from the positions shown in dotted lines.

The shackles $q^1$, $q^2$, $q^3$, $q^4$ being standard to the vehicle, are made to take spring pins at an angle to the centre line in order to allow for the angular setting of the springs in the original position. Some correction therfore must be made where the same shackles are employed with the springs parallel to one another. This is achieved by the use of special spring eye bushes.

With a vehicle fitted with extension pieces as above described, a minimum of alteration and addition is necessary and many components standard to the vehicle may be employed.

Further, the size and carrying capacity of the vehicle is increased and rendered more suitable for travelling over uneven ground.

What I claim is:—

1. A self-propelled road vehicle, comprising a chassis frame whereof the side members are tapered, extension pieces secured to said side members, each extension piece comprising two flanges disposed one above the other and arranged at an angle to one another and joined together by means of a ledge or step on which the said side members rest.

2. A self-propelled road vehicle, comprising a chassis frame whereof the side members are tapered, extension pieces secured to said side members, each extension piece comprising two flanges disposed one above the other and arranged at an angle to one another and joined together by means of a ledge or step on which the said side members rest, the lower flange being deepened to accommodate the spring bracket.

3. A self-propelled road vehicle comprising a chassis frame whereof the side members are tapered, extension pieces secured to said side members, each extension piece comprising two flanges disposed one above the other and joined together by means of a ledge or step on which the said side members rest, and a deep double cross member provided to brace together the side members and the extension pieces.

4. A self-propelled road vehicle, comprising a chassis frame whereof the side members are tapered, extension pieces secured to said side membrs, each extension piece comprising two flanges disposed one above the other and arranged at an angle to one another and joined together by means of a ledge or step on which the said side members rest, the lower flange being deepened to accommodate the spring bracket and a deep double cross member provided to brace together the side members and the extension pieces.

In testimony whereof he affixes his signature.

ERNEST THOMAS JAMES TAPP.